US010033734B2

(12) United States Patent
Sonoda et al.

(10) Patent No.: US 10,033,734 B2
(45) Date of Patent: Jul. 24, 2018

(54) APPARATUS MANAGEMENT SYSTEM, APPARATUS MANAGEMENT METHOD, AND PROGRAM

(71) Applicant: NEC Corporation, Tokyo (JP)

(72) Inventors: Kentaro Sonoda, Tokyo (JP); Hideyuki Shimonishi, Tokyo (JP); Yoichi Hatano, Tokyo (JP); Takayuki Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/905,687

(22) PCT Filed: Jul. 16, 2014

(86) PCT No.: PCT/JP2014/068884
§ 371 (c)(1),
(2) Date: Jan. 15, 2016

(87) PCT Pub. No.: WO2015/008780
PCT Pub. Date: Jan. 22, 2015

(65) Prior Publication Data
US 2016/0182510 A1 Jun. 23, 2016

(30) Foreign Application Priority Data

Jul. 17, 2013 (JP) .................. 2013-148350

(51) Int. Cl.
*H04L 29/06* (2006.01)
*H04L 12/24* (2006.01)

(52) U.S. Cl.
CPC ...... *H04L 63/0876* (2013.01); *H04L 41/0893* (2013.01)

(58) Field of Classification Search
CPC .................................. H04L 63/0876
See application file for complete search history.

(56) References Cited

U.S. PATENT DOCUMENTS 8,131,810 B2 * 3/2012 Tsutazawa ........... G06Q 10/107
370/328
8,713,635 B2 * 4/2014 Iga ....................... H04W 48/18
709/249

(Continued)

FOREIGN PATENT DOCUMENTS

JP 4002276 10/2007
WO WO 2012/115058 A1 8/2012

OTHER PUBLICATIONS

Method and System for Dynamically Associating Communication Devices; Jun. 23, 2011; Retrieved from: https://priorart.ip.com/IPCOM/000208107 (Year: 2011).*

(Continued)

*Primary Examiner* — Shawnchoy Rahman
(74) *Attorney, Agent, or Firm* — Finnegan, Henderson, Farabow, Garrett & Dunner, L.L.P.

(57) ABSTRACT

A apparatus management system includes: a forwarding node(s) that supplies identification information that uniquely identifies an individual terminal to a terminal management apparatus that manages the identification information; and the terminal management apparatus that discloses the identification information about a terminal to a corresponding user, requests the user to register himself/herself as a user of the terminal from a second terminal different from the terminal, and holds associates the terminal in association with the user.

16 Claims, 17 Drawing Sheets

(56) References Cited

U.S. PATENT DOCUMENTS

| | | | | |
|---|---|---|---|---|
| 2007/0043730 | A1* | 2/2007 | Wisely | G06F 17/30864 |
| 2007/0276957 | A1* | 11/2007 | King | H04L 29/12481 |
| | | | | 709/238 |
| 2008/0177885 | A1* | 7/2008 | Pierce | H04L 63/083 |
| | | | | 709/227 |
| 2012/0011571 | A1* | 1/2012 | Moroney | G06F 21/10 |
| | | | | 726/4 |
| 2013/0205380 | A1* | 8/2013 | Avni | H04L 63/0853 |
| | | | | 726/7 |
| 2013/0329738 | A1 | 12/2013 | Yamagata et al. | |

OTHER PUBLICATIONS

OpenFlow Switch Specification, Version 1.3.1 (Wire Protocol 0x04), [online], [searched on Apr. 10, 2013], Internet <URL: https://www.opennetworking.org/images/stories/downloads/sdn-resources/onf-specifications/openflow/openflow-spec-v1.3.1.pdf>, Sep. 2012.

N. McKeown et al., "OpenFlow: Enabling Innovation in Campus Networks", [online], [searched on Jul. 2, 2013], Internet <URL: http:/www.openflow.org/documents/openflow-wp-latest.pdf>, Mar. 2008.

International Search Report and Written Opinion dated Oct. 21, 2014 in counterpart PCT International Application.

Cisco, Cisco ga jitsugen suru BYOD (Bring Your Own Device) Device Sentaku no Jiyu to IT Network no Security, May 18, 2012.

K. Hiranaka, Shuyo Maker Kanzen Mora Koredake wa Yatte Okitai! Musen LAN Security Taisaku, PC Mode, vol. 10, No. 10, Oct. 2005.

Written Opinion of the International Search Authority dated Oct. 21, 2014 in counterpart PCT International Application No. PCT/JP2014/068884.

* cited by examiner

FIG. 3

IDENTIFICATION INFORMATION 700 ABOUT TERMINAL 600

| TERMINAL NAME | MAC ADDRESS | IP ADDRESS |
|---|---|---|
| aaaa | aa:aa:aa:aa:aa:aa | 1.1.1.1 |

FIG. 4

INFORMATION TABLE IN IDENTIFICATION INFORMATION STORAGE APPARATUS 400

| TERMINAL NAME | USER ID | MAC ADDRESS | IP ADDRESS | CONNECTED FORWARDING NODE | CONNECTION PORT |
|---|---|---|---|---|---|
| aaaa | | aa:aa:aa:aa:aa:aa | 1.1.1.1 | switch1 | 1 |
| bbbb | | bb:bb:bb:bb:bb:bb | | switch1 | 2 |
| cccc | | cc:cc:cc:cc:cc:cc | | switch2 | 1 |
| dddd | | dd:dd:dd:dd:dd:dd | 4.4.4.4 | switch3 | 3 |
| ... | | ... | ... | ... | ... |

FIG. 5

COMMUNICATION POLICY TABLE IN POLICY STORAGE APPARATUS 500

| USER ID | TERMINAL GROUP ID | ACCESS RIGHT |
|---|---|---|
| alice | resource_group_0001 | allow |
| alice | resource_group_0002 | allow |
| bob | resource_group_0001 | deny |
| bob | resource_group_0002 | allow |
| ... | ... | ... |

FIG. 6

TERMINAL-GROUP INFORMATION TABLE IN POLICY STORAGE APPARATUS 500

| TERMINAL GROUP ID | TERMINAL NAME | TERMINAL ATTRIBUTE |
|---|---|---|
| resource_group_0001 | aaaa | MAC=aa:aa:aa:aa:aa:aa<br>IP=1.1.1.1<br>SERVICE=80/tcp |
| | bbbb | IP=2.2.2.2 |
| | cccc | |
| resource_group_0002 | dddd | MAC=xx:xx:xx:xx:xx:xx<br>IP=x.x.x.x |
| ... | ... | ... |

FIG. 7

CONNECTED-TERMINAL LIST

| TERMINAL NAME | USER ID | MAC ADDRESS | IP ADDRESS | CONNECTED FORWARDING NODE | CONNECTION PORT |
|---|---|---|---|---|---|
| aaaa | alice | aa:aa:aa:aa:aa:aa | 1.1.1.1 | switch1 | 1 |
| bbbb | bob | bb:bb:bb:bb:bb:bb | | switch1 | 2 |
| cccc | chris | cc:cc:cc:cc:cc:cc | | switch2 | 1 |
| dddd | david | dd:dd:dd:dd:dd:dd | 4.4.4.4 | switch3 | 3 |
| ... | ... | ... | ... | ... | ... |

REGISTER

FIG. 8

ACCESS CONTROL INFORMATION

| SOURCE TERMINAL NAME | DESTINATION TERMINAL NAME | ACCESS RIGHT | CONDITION (OPTION) |
|---|---|---|---|
| aaaa | bbbb | allow | 80/tcp |
| bbbb | dddd | deny | |
| ... | ... | ... | ... |

FIG. 15

CORRESPONDENCE INFORMATION TABLE IN
CORRESPONDENCE INFORMATION STORAGE APPARATUS 900

| TERMINAL NAME | USER ID |
|---|---|
| aaaa | alice |
| bbbb | bob |
| cccc | chris |
| dddd | david |
| ... | ... |

FIG. 17

Header Fields; Matching Rules

| Wildcards | In Port | Ether SA | Ether DA | Ether type | VLAN ID | VLAN PCP | IP SA | IP DA | IP proto | IP ToS bits | TCP/UDP src port | TCP/UDP dst port | Counters | Actions |

APPARATUS MANAGEMENT SYSTEM, APPARATUS MANAGEMENT METHOD, AND PROGRAM

REFERENCE TO RELATED APPLICATION

The present invention is a National Stage Entry of International Application No. PCT/JP2014/068884, filed Jul. 16, 2014, which is based upon and claims the benefit of the priority of Japanese patent application No. 2013-148350, filed on Jul. 17, 2013, the disclosure of which is incorporated herein in its entirety by reference thereto.

TECHNICAL FIELD

The present invention relates to an apparatus management system, an apparatus management method, and a program. In particular, the present invention relates to: an apparatus management system; an apparatus management method; and a program for managing apparatuses such as terminals that are connected to a network. In particular, without installing management software in terminals such as servers, the terminals connected to the network can be managed, and access to the network from the terminals can properly be managed and controlled.

BACKGROUND

In a corporate network or the like (for example, an in-house LAN (local area network)), security measures are essential to prevent unauthorized access from both inside and outside the network. For example, an administrator of a corporate network needs to properly control access to the network and manage terminals connected to the network. In particular, managing the terminals connected to the network is not difficult in a case where the network administrator previously grasps identification numbers (for example, IP (Internet Protocol) addresses, MAC (Media Access Control) addresses, resource numbers, etc.) and installation locations of the terminals before the terminals are connected to the network.

However, if an employee (a user using the network) connects a terminal or the like to the network without prior consent of the network administrator, it is very difficult for the network administrator to grasp the existence of the terminal. In a case where the network administrator cannot manage such terminals, operations such as for identifying a terminal that has caused a security incident and checking the terminals for inventory will be very complicated and time-consuming. These days, more and more companies adopt BYOD (Bring Your Own Device), which is a policy of allowing employees to use their own terminals for work. In such a corporate environment, there is an operation form in which the network administrator previously manages all the terminals before these terminals are connected to the corporate network. However, since smooth work by the employees could be disturbed, there is a great difficult.

PTL 1 discloses an unauthorized-connection detection system for detecting unauthorized connection to a network by unauthorized terminals having no access rights. According to a method disclosed in [0009] in PTL 1, a dedicated monitoring program is stored in each authorized terminal having an access right to the network. When an authorized terminal is connected to the network, the monitoring program causes the terminal to perform a predetermined operation and transmit predetermined information to a management server that manages the network. By checking the presence and content of the information, connection to the network by an unauthorized terminal having no access right is detected.

NPLs 1 and 2 propose a technique referred to as Open-Flow (see NPLs 1 and 2). OpenFlow recognizes communications as end-to-end flows and performs path control, failure recovery, load balancing, and optimization on a per-flow basis. An OpenFlow switch standardized in NPL 2 has a secure channel for communication with an OpenFlow controller and operates according to a flow table suitably added or rewritten by the OpenFlow controller. In the flow table, a set of the following three is defined for each flow: match fields that define contents against which packet headers are matched; flow statistical information (Counters); and an instruction(s) that defines a processing content(s) (see section "5.2 Flow Table" in NPL 2).

For example, when an OpenFlow switch receives a packet, the OpenFlow switch searches its flow table for an entry having a match field(s) that matches header information of the received packet (see "5.3 Matching" in NPL 2). As a result of the search, if the OpenFlow switch finds an entry that matches the received packet, the OpenFlow switch updates its flow statistical information (Counters) and processes the received packet, based on the processing content(s) (packet transmission from a specified port, flooding, dropping, or the like) written in the instruction field of the entry. If, as a result of the search, the OpenFlow switch does not find an entry that matches the received packet, the OpenFlow switch requests the OpenFlow controller to set an entry for processing the received packet, namely, transmits a processing content determination request to the OpenFlow controller via the corresponding secure channel. The Open-Flow switch receives a flow entry that corresponds to the request and updates its own flow table. In this way, the OpenFlow switch performs packet forwarding by using an entry stored in its flow table as a processing rule.

PTL 1: Japanese Patent No. 4002276

NPL 1: Nick McKeown, and seven others, "OpenFlow: Enabling Innovation in Campus Networks," [online], [searched on Jul. 2, 2013], Internet <URL:http://www.openflow.org/documents/openflow-wp-latest.pdf>

NPL 2: "OpenFlow Switch Specification" Version 1.3.1 (Wire Protocol 0x04), [online], [searched on Jul. 2, 2013], Internet <URL:https://www.opennetworking.org/images/stories/downloads/sdn-resources/onf-specifications/openflow/openflow-spec-v1.3.1.pdf>

SUMMARY

The following analysis has been given by the present invention. According to the technique disclosed in PTL 1, for example, when an employee connects a terminal to a corporate network, a monitoring program stored in the terminal causes the terminal to provide a management server with management information relating to an IP address, a MAC address, and an owner of the terminal, for example. By referring to the information obtained by the management server, the network administrator can manage all the terminals connected to the corporate network. However, in this case, since the network administrator needs to instruct all the employees to store the management program in their terminals, much burden is placed on the network administrator.

In addition, to enable the technique according to PTL 1 to effectively function, the network administrator needs to have each of the employees store the monitoring program in all the terminals personally owned by the employee. In particular, some employees may hesitate to store the monitoring program in their BYODs. Regarding the use of BYODs, it might be attempted to adopt a corporate operation policy that requires the employees to install the monitoring program in their BYODs. However, if possible, it is desirable that employees freely use their BYODs, which are their personally owned terminals, without having to store the monitoring program used for work in the BYODs.

In addition, according to techniques disclosed in NPLs 1 and 2, for example, when an OpenFlow switch transmits a received packet to the OpenFlow controller, the OpenFlow controller can acquire information about the source IP address and MAC address and the destination IP address and MAC address of the packet. However, the OpenFlow controller cannot acquire information about the owner of the terminal that has transmitted the packet. Thus, the techniques disclosed in PTL 1 and NPL 1 are insufficient in terms of effectively managing all terminals connected to a corporate network. Namely, there is room for improvement.

It is an object of the present invention to provide: an apparatus management system; an apparatus management method; and a program that can manage terminals and the like connected to a network in a centralized-control-type network environment such as OpenFlow described in NPLs 1 and 2 without installing special software such as a monitoring program in the terminals.

According to a first aspect, there is provided an apparatus management system, including: a forwarding node(s) that supplies identification information that uniquely identifies an individual terminal to a terminal management apparatus that manages the identification information; and the terminal management apparatus that discloses the identification information about a terminal to a user, requests the user to register himself/herself as a user of the terminal from a second terminal different from the terminal, and holds the terminal in association with the user.

According to a second aspect, there is provided an apparatus management system, including: a forwarding node(s) that supplies identification information that uniquely identifies an individual terminal to a terminal management apparatus that manages the identification information; a user authentication apparatus that uniquely identifies an individual user; and the terminal management apparatus that, by using the user authentication apparatus, determines a user who uses a terminal, and holds the terminal in association with the user.

According to a third aspect, there is provided an apparatus management method, including: disclosing, to a user, identification information that uniquely identifies a terminal which has been received from a forwarding node; and requesting the user to register himself/herself as a user of the terminal from a second terminal different from the terminal, and holding the terminal in association with the user. This method is associated with a certain machine, namely, with the terminal management apparatus that associates a terminal(s) with a user(s) and holds the associated information.

According to a fourth aspect, there is provided a program, causing a computer to perform processing for: disclosing, to a user, identification information that has been transmitted from a forwarding node and that uniquely identifies a terminal; and requesting the user to register himself/herself as a user of the terminal from a second terminal different from the terminal, and holding the terminal in association with the user. This program can be recorded in a computer-readable (non-transient) storage medium. Namely, the present invention can be embodied as a computer program product.

The meritorious effects of the present invention are summarized as follows.

According to the present invention, in a centralized-control-type network environment, terminals and the like connected to a network can be managed without installing special software such as a monitoring program in the terminals. That means that the present invention transforms the apparatus management system, an apparatus management method, and a program into those having improved manageability.

BRIEF DESCRIPTION OF DRAWINGS

FIG. 3 illustrates an example of identification information about a terminal used in the first exemplary embodiment of the present disclosure.

FIG. 4 illustrates an identification information table held in an identification information storage apparatus according to the first exemplary embodiment of the present disclosure.

FIG. 5 illustrates a communication policy table held in a policy storage apparatus according to the first exemplary embodiment of the present disclosure.

FIG. 6 illustrates a terminal-group information table held in the policy storage apparatus according to the first exemplary embodiment of the present disclosure.

FIG. 7 illustrates a mode of identification information about terminals displayed by a terminal management apparatus according to the first exemplary embodiment of the present disclosure.

FIG. 8 illustrates an example of access control information held in a communication control apparatus according to the first exemplary embodiment of the present disclosure.

FIG. 15 illustrates a correspondence information table held in a correspondence information storage apparatus according to the third exemplary embodiment of the present disclosure.

FIG. 17 schematically illustrates a processing rule set in a forwarding node according to each of the above exemplary embodiments of the present disclosure.

PREFERRED MODES

Figure 1:
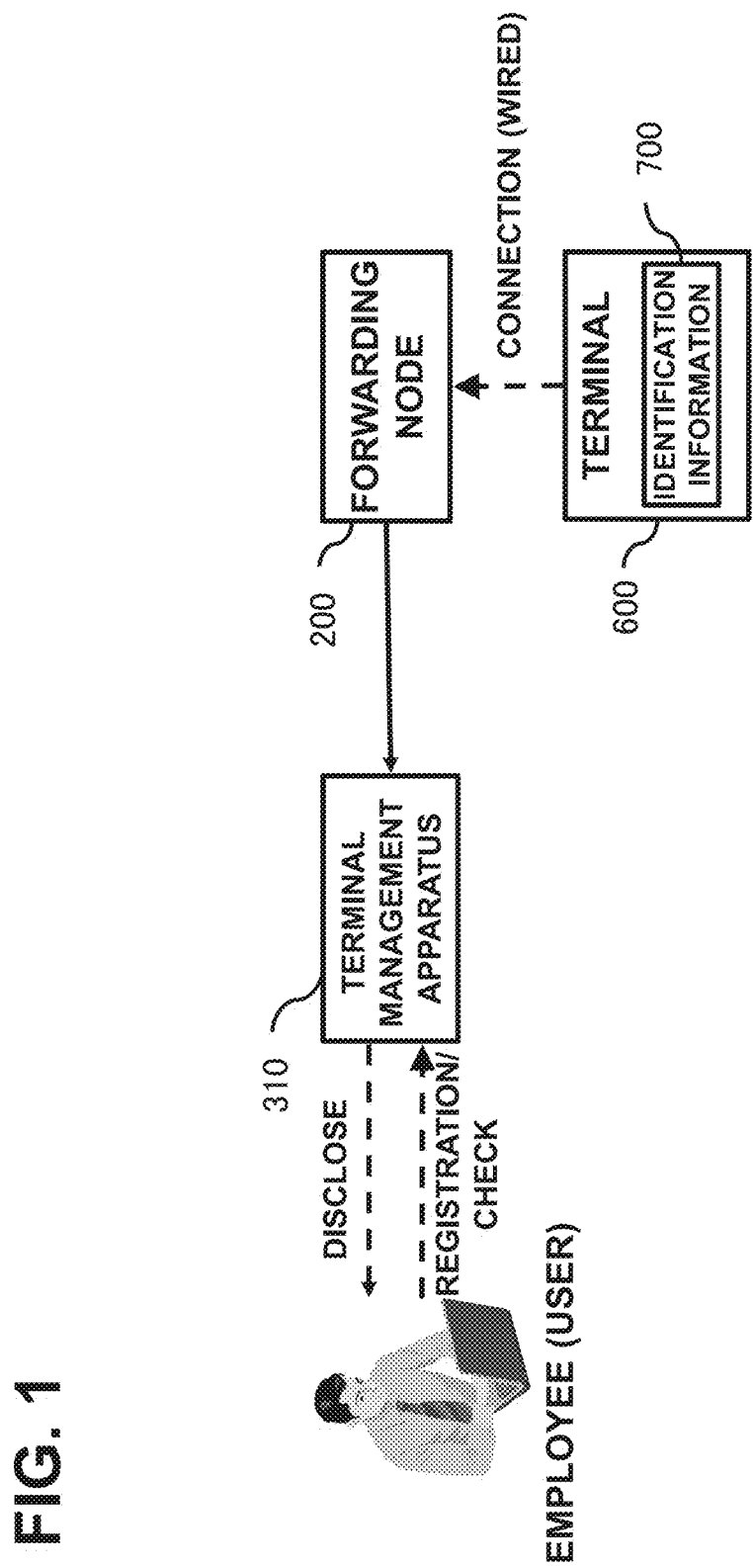
FIG. 1 illustrates a configuration according to an exemplary embodiment of the present disclosure.

First, an outline of an exemplary embodiment according to the present disclosure will be described with reference to a drawing. In the following outline, various components are denoted by reference characters for the sake of convenience. Namely, the following reference characters are merely used as examples to facilitate understanding of the present disclosure, not to limit the present disclosure to the illustrated modes.

As illustrated in FIG. 1, an exemplary embodiment of the present disclosure can be realized by an apparatus management system including: a terminal management apparatus 310; and a forwarding node 200 that supplies identification information 700 that uniquely identifies a terminal 600 to the terminal management apparatus 310 that manages the identification information 700.

More specifically, when supplied with the identification information 700 by the forwarding node 200, the terminal management apparatus 310 discloses the identification information 700 about the terminal 600 to the user. Next, the terminal management apparatus 310 requests the user to register himself or herself as a user of the terminal 600 from a second terminal (for example, a terminal used by the employee (user) in FIG. 1) different from the terminal 600. Next, the terminal management apparatus 310 holds (stores) the terminal 600 in association with the user.

In this way, a personal terminal(s) BYOD and the like of a user(s) can be managed in a simple way.

First Exemplary Embodiment

Figure 2:
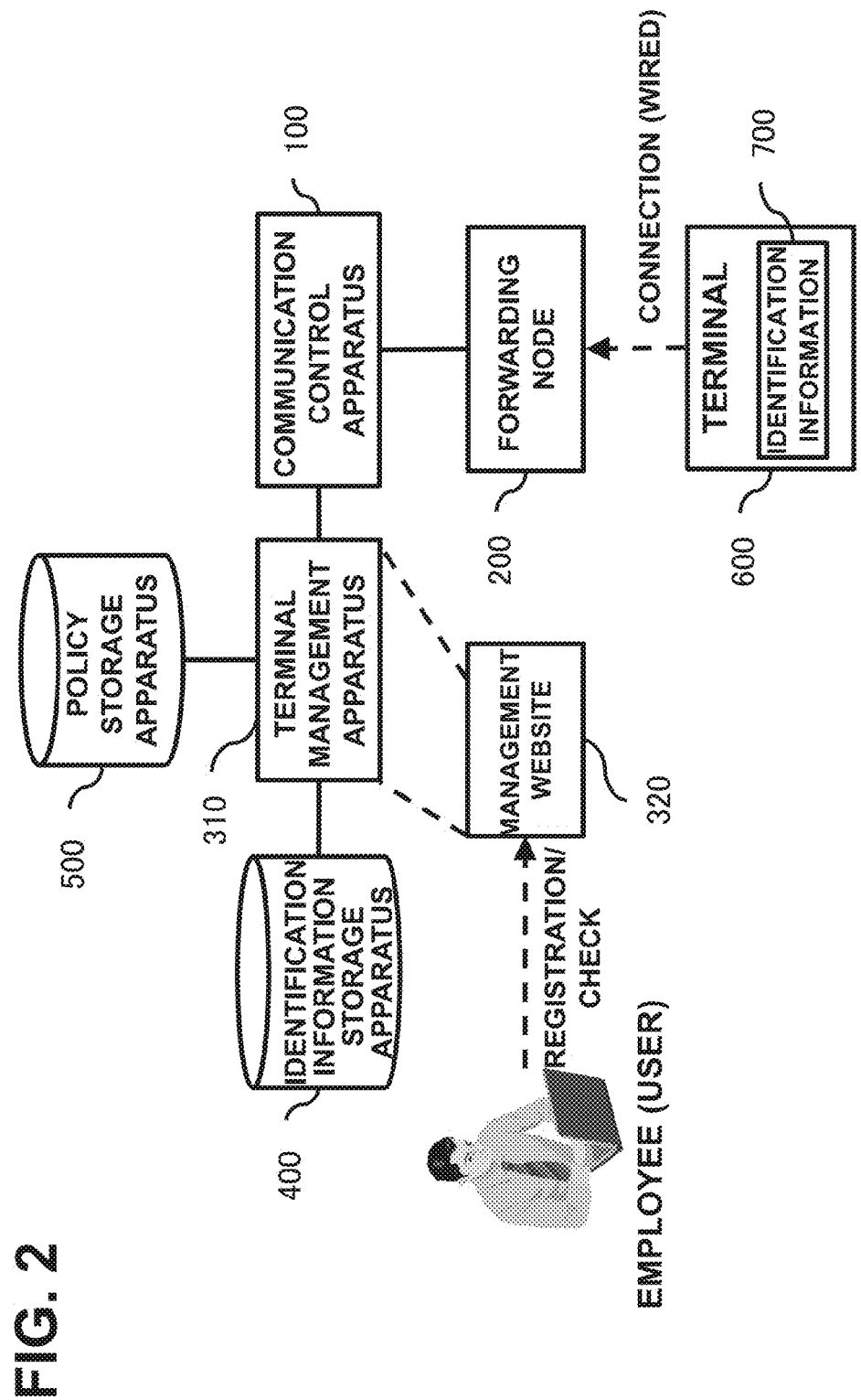
FIG. 2 illustrates a configuration of an apparatus management system according to a first exemplary embodiment of the present disclosure.

Next, a first exemplary embodiment of the present disclosure will be described in detail. FIG. 2 illustrates a configuration of an apparatus management system according to the first exemplary embodiment of the present disclosure. As illustrated in FIG. 2, the apparatus management system includes: a forwarding node 200 that forwards packets based on processing rules; a communication control apparatus 100 that registers processing rules in the forwarding node 200; a terminal management apparatus 310 that notifies the communication control apparatus 100 of communication policies; a management website 320 that registers, for example, information about the owners of terminals in the terminal management apparatus 310; and an identification information storage apparatus 400 and a policy storage apparatus 500 that are used by the terminal management apparatus 310 for determining communication policies.

The forwarding node 200 is a switching apparatus that processes received packets in accordance with processing rules. In each processing rule, matching rules (see matching rules in FIG. 17, for example) against which the received packets are matched and a processing content(s) applied to the packets that match the matching rules are associated with each other. For example, an OpenFlow switch in NPL 2 that operates by using a flow entry illustrated in FIG. 17 as a processing rule may be used as the forwarding node 200.

In addition, the terminal 600 is connected to the forwarding node 200 in FIG. 2. The terminal 600 can communicate with a different forwarding node(s) (not illustrated) and terminal(s) (not illustrated) connected to the forwarding node 200 via the forwarding node 200.

The terminal 600 is a computer such as a server, a PC (personal computer), or a smartphone. An individual terminal holds identification information 700 for uniquely identifying itself. For example, the identification information is represented by a terminal name, a MAC address, or an IP address, or any combination thereof. The identification information may be any information, as long as the identification information can uniquely identify the terminal concerned. The present exemplary embodiment will be described assuming that the terminal 600 is connected to the forwarding node 200 by a wire. However, for example, a mobile terminal such as a tablet terminal or a smartphone may be wirelessly connected to the forwarding node 200.

FIG. 3 illustrates an example of the identification information 700 about the terminal 600. As illustrated in FIG. 3, the identification information 700 about the terminal 600 includes a terminal name, a MAC address, and an IP address that are associated with each other. In the example in FIG. 3, in the identification information 700 about the terminal 600, the terminal name is "aaaa," the MAC address is "aa:aa:aa:aa:aa:aa," and the IP address is "1.1.1.1." In the present exemplary embodiment, per terminal, the identification information needs to include a MAC address. However, a terminal name and an IP address may be left blank.

The terminal management apparatus 310 is connected to: the identification information storage apparatus 400 that holds the identification information 700 about the terminal 600; the policy storage apparatus 500 that holds communication policies that correspond to user groups, etc.; and the management website 320 on which the users register ownerships of their terminals. When the terminal 600 is connected to the forwarding node 200, the terminal management apparatus 310 receives the identification information 700 about the terminal 600 from the forwarding node 200 via the communication control apparatus 100. After receiving the identification information 700, the terminal management apparatus 310 refers to the identification information stored in the identification information storage apparatus 400 and the communication policies stored in the policy storage apparatus 500. The terminal management apparatus 310 provides the communication control apparatus 100 with access control information corresponding to the terminal 600, the information indicating, for example, whether the terminal 600 has the access right. In the example in FIG. 2, the terminal management apparatus 310 receives the identification information 700 about the terminal 600 via the communication control apparatus 100 and records the received information in the identification information storage apparatus 400. However, the terminal management apparatus 310 may receive the identification information 700 about the terminal 600 from the forwarding node 200. Alternatively, the communication control apparatus 100 may include the terminal management apparatus 310.

When the terminal 600 is connected to the forwarding node 200, the identification information storage apparatus 400 receives the identification information 700 about the terminal 600 forwarded from the forwarding node 200 via the communication control apparatus 100 and holds the received information. FIG. 4 illustrates an example of an identification information table held in the identification information storage apparatus 400. The identification information table in FIG. 4 can hold entries, in each of which a terminal name, a user ID, a MAC address, an IP address, a connected forwarding node, and a connection port are associated with each other. For example, the first entry in the identification information table in FIG. 4 indicates that there is a terminal whose terminal name is "aaaa," MAC address is "aa:aa:aa:aa:aa:aa," IP address is "1.1.1.1," connected forwarding node is "switch 1," and connection port is "1." At this point, since the owners of the terminals are not determined yet, no values are set in the user ID fields. When a user of a terminal registers ownership of the terminal via the management website 320 connected to the terminal management apparatus 310, the corresponding user ID is set. In this way, when an unknown terminal 600 is connected to the forwarding node 200, an entry, in which a forwarding node name of the forwarding node 200 and a connection port number of the forwarding node are associated with each other, is added to the identification information table in the identification information storage apparatus 400.

The communication control apparatus 100 controls the forwarding node 200 by setting a processing rule(s). The communication control apparatus 100 according to the present exemplary embodiment sets a processing rule in the forwarding node 200, the processing rule causing the forwarding node 200 to drop any packets in which access permission or rejection is not specified. By setting this processing rule, for example, if a new terminal 600 is connected to the forwarding node 200, access from the new terminal 600 to the management website 320 that discloses (makes available) identification information about the new terminal 600 is denied. The OpenFlow controller in NPLs 1 and 2 may be used as the communication control apparatus 100. The communication control apparatus 100 according to the present exemplary embodiment is capable of managing names and connection ports of forwarding nodes, which is a general mechanism of OpenFlow. In addition, the identification information storage apparatus 400 may be included as a part of the terminal management apparatus 310 or the communication control apparatus 100.

The policy storage apparatus 500 holds communication policies that correspond to user groups, etc. The policy storage apparatus 500 holds access control information about users and terminals. The access control information is registered by a network administrator (not illustrated) in advance. The access control information is used when the terminal management apparatus 310 determines an access control content applied to a terminal and notifies the communication control apparatus 100 of the determined access control content.

FIG. 5 illustrates examples of the communication policies stored in the policy storage apparatus 500. FIG. 5 illustrates a communication policy table that can store entries, in each of which a user ID, a terminal-group ID, and an access right are associated with each other. In the example in FIG. 5, each user identified by a user ID is associated with communication policy information in which the corresponding terminal-group ID that groups terminals and the corresponding access right is set. The associated information is stored in the communication policy table. For example, in the case of a user ID=alice, access to both resource group IDs "resource_group_0001" and "resource_group_0002" is allowed. In the case of a user ID=bob, while access to the resource group ID "resource_group_0001" is denied, access to the resource group ID "resource_group_0002" is allowed. For example, generally, companies manage employee information by using a database or the like. Based on such employee information, the user IDs are registered in advance.

In addition, FIG. 6 illustrates an example of the terminal-group information stored in the policy storage apparatus 500. In FIG. 6, in each entry, a terminal-group ID of a terminal(s) that belongs to the above resource group ID(s), a corresponding terminal name(s), and a corresponding terminal attribute(s) are associated with each other. For example, a group identified by the terminal-group ID=resource_group_0001 includes terminals having terminal names aaaa, bbbb, and cccc, respectively. For example, an IP address, a MAC address, and a port number used for a service for each of the terminals can be determined.

When a user registers the owner of his/her own terminal via the management website 320, the terminal management apparatus 310 refers to the above identification information, communication policy information, and terminal-group information and determines an access control content applied to the terminal, based on the terminal 600 connected to the forwarding node 200 and the access right of the owner of the terminal 600. Next, the terminal management apparatus 310 notifies the communication control apparatus 100 of the determined access control content.

For example, if the terminal 600 is connected to the forwarding node 200, the terminal management apparatus 310 stores the identification information 700 about the terminal 600 in the identification information storage apparatus 400. As illustrated in FIG. 7, on the management website 320, information about the terminal 600 connected to the forwarding node 200 is automatically posted as an entry in a connected-terminal list. Next, the user finds the entry about the terminal 600 connected by the user in the connected-terminal list, sets the owner (alice) in the corresponding user ID field, and presses a register button to complete the processing. For example, the user accesses the management website 320, finds the entry about the terminal 600 which the user has previously connected to the forwarding node 200 on the management website 320, and registers that the user (in this case, "alice" for convenience) has ownership of the terminal 600. In response, the registered information is reflected on the management website 320 (see the user ID field that corresponds to the terminal name "aaaa" in FIG. 7).

When the above registration has been completed, the terminal management apparatus 310 can determine the corresponding terminal-group ID and the corresponding access right, based on the terminal owned by the user. For example, assuming that the terminal name of the terminal 600 connected to the forwarding node 200 is aaaa and the owner of the terminal 600 is the user ID=alice, first, the terminal management apparatus 310 searches the identification information table in the identification information storage apparatus 400 in FIG. 4 for an entry that matches the identification information about the terminal 600 and determines that the terminal name aaaa is owned by the user ID=alice. Next, by referring to the entries that include the user ID=alice in the communication policy table in the policy storage apparatus 500 in FIG. 5, the terminal management apparatus 310 recognizes that the user having the user ID "alice" is allowed to access to the terminal-group ID resource_group_0001 and to the terminal-group ID resource_group_0002. In addition, by referring to the terminal-group information table in the policy storage apparatus 500 in FIG. 6, the terminal management apparatus 310 acquires the terminal names of the terminals that belong to the terminal-group IDs resource_group_0001 and resource_group_0002 and the terminal attributes of the terminals. In this way, access control information about the terminal name=aaaa owned by the user ID=alice is determined. Next, the terminal management apparatus 310 notifies the communication control apparatus 100 of the determined access control information about to the user.

FIG. 8 illustrates an example of access control information about the terminal having the terminal name=aaaa, the access control information created from the information illustrated in FIGS. 4 to 6 and supplied to the communication control apparatus 100. In an entry under "source terminal name" in FIG. 8, a terminal name stored in the identification information table in the identification information storage apparatus 400 in FIG. 4 is set. In an entry under "destination terminal name," a terminal name in the terminal-group information table defined in the communication policy table in the policy storage apparatus 500 in FIG. 5 is set. In addition, in an entry under "access right," a content (allow/deny) obtained by referring to the communication policy table in the policy storage apparatus 500 in FIG. 5 is set. In addition, in an entry under "condition (option)," information set as a terminal attribute in the terminal-group information table in the policy storage apparatus 500 in FIG. 6 is set. In addition, in the present exemplary embodiment, among the access control information in FIG. 8, the source terminal name, the destination terminal name, and the access right are essential. However, the condition (option) can optionally be included.

In this operation, the user cannot access the management website 320 from the terminal 600 connected to the forwarding node 200 (since the user is registering the terminal 600 at this moment). Therefore, the user uses a terminal different from the terminal 600 to access the management website 320 and registers the user of the terminal 600. More specifically, the management website 320 can only be accessed from the terminals managed by the terminal management apparatus 310. This is because the forwarding node 200 is controlled by the communication control apparatus 100 to drop any packets in which access permission or rejection is not specified. With this mechanism, the user can access the management website 320 and refer to the list of identification information, only by using a terminal that has already been registered in the network configured and managed by the present terminal authentication system. In addition, by performing the registration operation by using a terminal that is allowed to connect to the network configured and managed by the present apparatus management system, the user can declare himself or herself to be the user of the terminal whose information has been posted on the management website 320. As described above, according to the present exemplary embodiment, security is ensured with a flexible mechanism.

In addition, the terminal management apparatus 310 also has a mechanism for receiving communication policy creation requests, setting change requests, etc. from an administrator(s) and terminal owner change requests, etc. from users and notifying the communication control apparatus 100 of relevant results (hereinafter, this function is referred to as an "editing function"). For example, the editing function is realized by executing an application program (which could simply be referred to as "application") that realizes a function of editing communication policies, user IDs, terminal names, etc. By using the editing function, the administrator(s) and the users can freely create, modify, and delete communication policies, user IDs, terminal names, etc. any time. The terminal management apparatus 310 stores the updated information in the identification information storage apparatus 400 and the policy storage apparatus 500, creates access control information applied to a terminal based on the updated information, and notifies the communication control apparatus 100 of the created access control information.

As described above, the administrators and users who use the terminal management according to the present exemplary embodiment can freely create, modify, and delete communication policies, user IDs, terminal names, etc. any time. The above communication policy management mechanism may be provided in any mode. For example, the above mechanism may be provided as a web-based system for the users or may be provided as an application executed on an independent PC. The mechanism does not have to be provided as an application with a GUI (Graphical User Interface) but may be provided as an application with a CLI (Command Line Interface).

After receiving the above access control information from the terminal management apparatus 310, first, the communication control apparatus 100 creates a processing rule that causes the forwarding node 200 to transmit a processing rule setting request (for example, a Packet-In message in NPL 2) as to the packets transmitted from a terminal to which the access control information is applied. The terminal management apparatus 310 sets the created processing rule in the forwarding node 200. In addition, in accordance with the processing rule, if the communication control apparatus 100 receives a processing rule setting request, based on packet information included in the processing rule setting request, the communication control apparatus 100 calculates a packet forwarding path, creates a processing rule(s) that realizes the forwarding path, and sets the created processing rule(s) in the relevant appropriate forwarding node(s) on the packet forwarding path.

Figure 9:
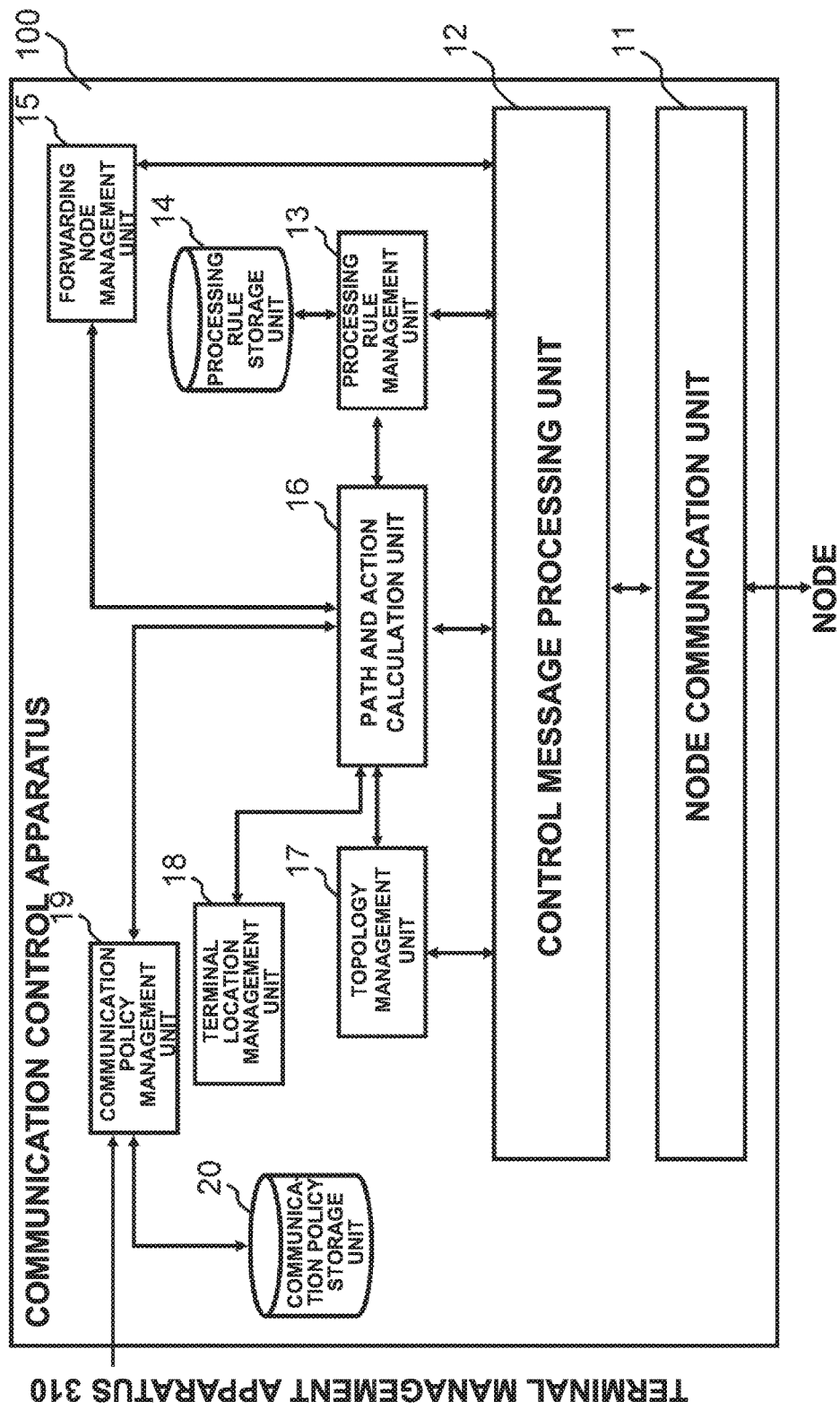
FIG. 9 illustrates an example of a configuration of the communication control apparatus according to the first exemplary embodiment of the present disclosure.

FIG. 9 is a block diagram illustrating a detailed configuration of the communication control apparatus 100 according to the present exemplary embodiment. As illustrated in FIG. 9, the communication control apparatus 100 includes a node communication unit 11 that communicates with the forwarding node 200, a control message processing unit 12, a processing rule management unit 13, a processing rule storage unit 14, a forwarding node management unit 15, a path and action calculation unit 16, a topology management unit 17, a terminal location management unit 18, a communication policy management unit 19, and a communication policy storage unit 20. Operations of these elements will be described below.

The control message processing unit 12 analyzes a control message received from a forwarding node and transmits information about the received control message to relevant processing means in the communication control apparatus 100.

The processing rule management unit 13 manages the processing rules that are set in each of the forwarding nodes. More specifically, the processing rule management unit 13 registers a processing rule(s) created by the path and action calculation unit 16 in the processing rule storage unit 14 and sets the created processing rule(s) in an appropriate forwarding node(s). If the processing rule management unit 13 receives a processing rule deletion notification, etc. transmitted from a forwarding node and detects change in a processing rule set in a forwarding node, the processing rule management unit 13 updates the information registered in the processing rule management storage unit 14.

The forwarding node management unit 15 manages the capabilities of an individual forwarding node controlled by the communication control apparatus 100 (for example, the number of ports, the types of ports, and the types of actions supported.).

When receiving a communication policy from the communication policy management unit 19, first, based on the received communication policy, the path and action calculation unit 16 refers to a network topology held in the topology management unit 17 and creates a processing rule for executing a processing rule setting request as to the packets transmitted from the user in question. The processing rule may be set in each of the forwarding nodes to which the user terminal could be connected. Alternatively, the processing rule may be set in a forwarding node (for example, the forwarding node 200 in FIG. 1) selected from the terminal location management unit 18, based on source information included in the communication policy.

In addition, in accordance with the above processing rule, when receiving the processing rule setting request, the path and action calculation unit 16 calculates a forwarding path for the relevant packets and creates a processing rule(s) that realizes the forwarding path, based on the packet information included in the processing rule setting request.

More specifically, the path and action calculation unit 16 calculates a packet forwarding path, based on location information about communication terminals managed by the terminal location management unit 18 and network topology information established by the topology management unit 17. Next, the path and action calculation unit 16 acquires information about ports of the forwarding node(s) on the forwarding path, etc. from the forwarding node management unit 15 and calculates an action(s) executed by the forwarding node(s) on the path to realize the calculated forwarding path and matching rules for determining a flow to which the action(s) is applied. The matching rules can be created by using a source terminal address, a destination terminal address, a condition (option), etc. included in the access control information in FIG. 8. Namely, if the first entry in the access control information in FIG. 8 is used, the path and action calculation unit 16 creates an individual processing rule that defines an action for forwarding packets from the source terminal name "aaaa" to the destination terminal name "bbbb" via a port connected to the next forwarding node on the path. In addition, when setting the above processing rule, the path and action calculation unit 16 may create not only a processing rule(s) that realizes packet forwarding of the packets for which a processing rule setting request has been made but also a processing rule(s) that realizes packet forwarding to a different resource(s) which the terminal is allowed to access.

The topology management unit 17 establishes network topology information based on a connection relationship among the forwarding nodes 200 collected via the node communication unit 11.

The terminal location management unit 18 manages information for determining the locations of resources connected to a communication system. In the present exemplary embodiment, a resource name is used as information for identifying a resource, and a forwarding node identifier of a forwarding node to which a resource is connected and information about a port of the forwarding node are used as information for determining the location of the resource. Of course, instead of the above information, for example, information given by an apparatus (not illustrated) having an authentication function may be used to determine the resource(s) and the location thereof.

When receiving access control information from the terminal management apparatus 310, the communication policy management unit 19 stores the received information in the communication policy storage unit 20 and transmits the received information to the path and action calculation unit 16.

The above communication control apparatus 100 can also be realized by adding a function of creating a processing rule(s) (a flow entry(ies)) upon the reception of a communication policy to the OpenFlow controller in NPLs 1 and 2.

Each unit (processing means) in the communication control apparatus 100 illustrated in FIG. 9 may be realized by a computer program which causes a computer that constitutes the communication control apparatus 100 to use its hardware, store the above information, and perform the above processing.

Figure 10:
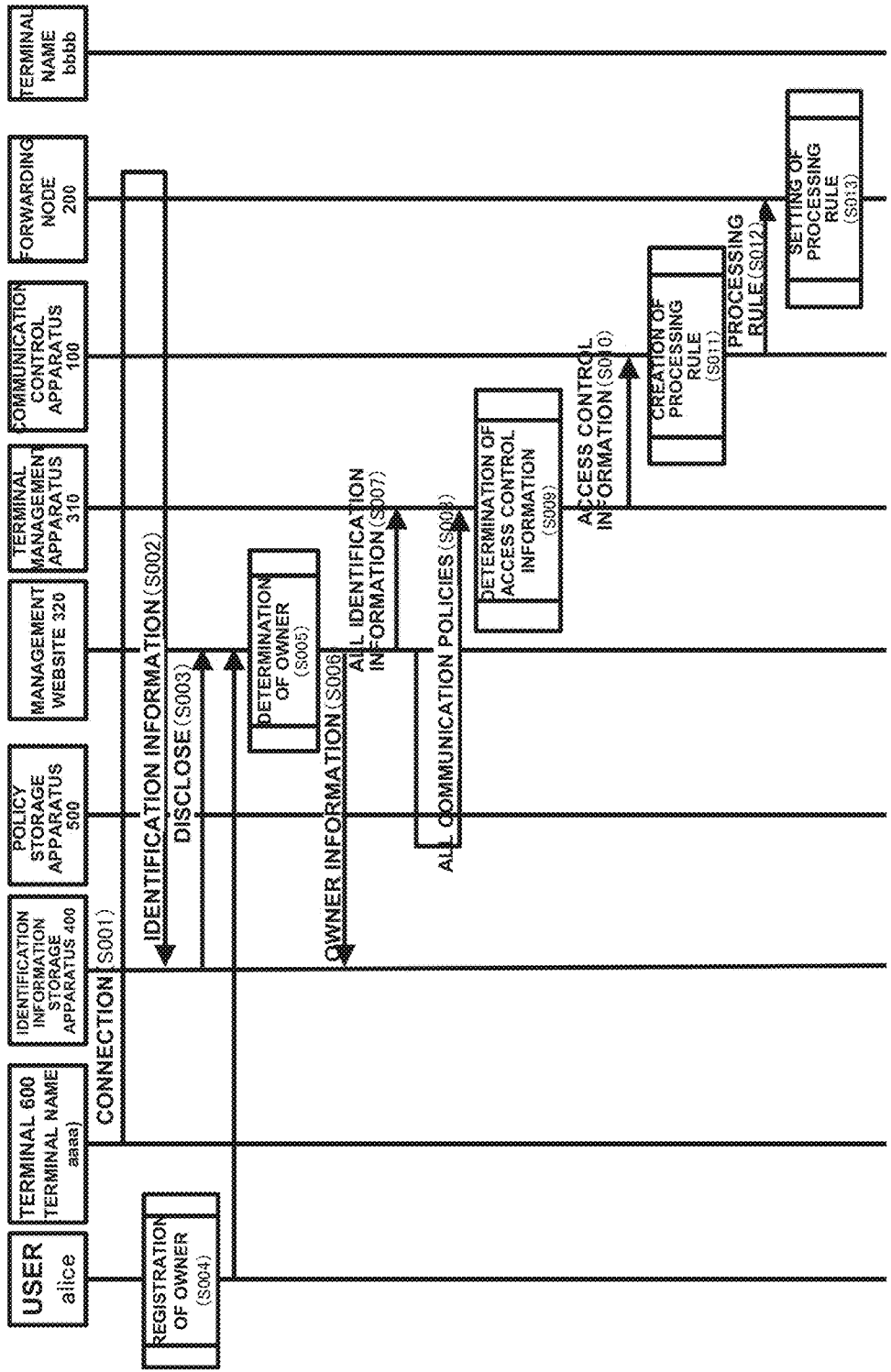
FIG. 10 is a sequence diagram illustrating an operation (registration of a new terminal) in the apparatus management system according to the first exemplary embodiment of the present disclosure.
Figure 11:
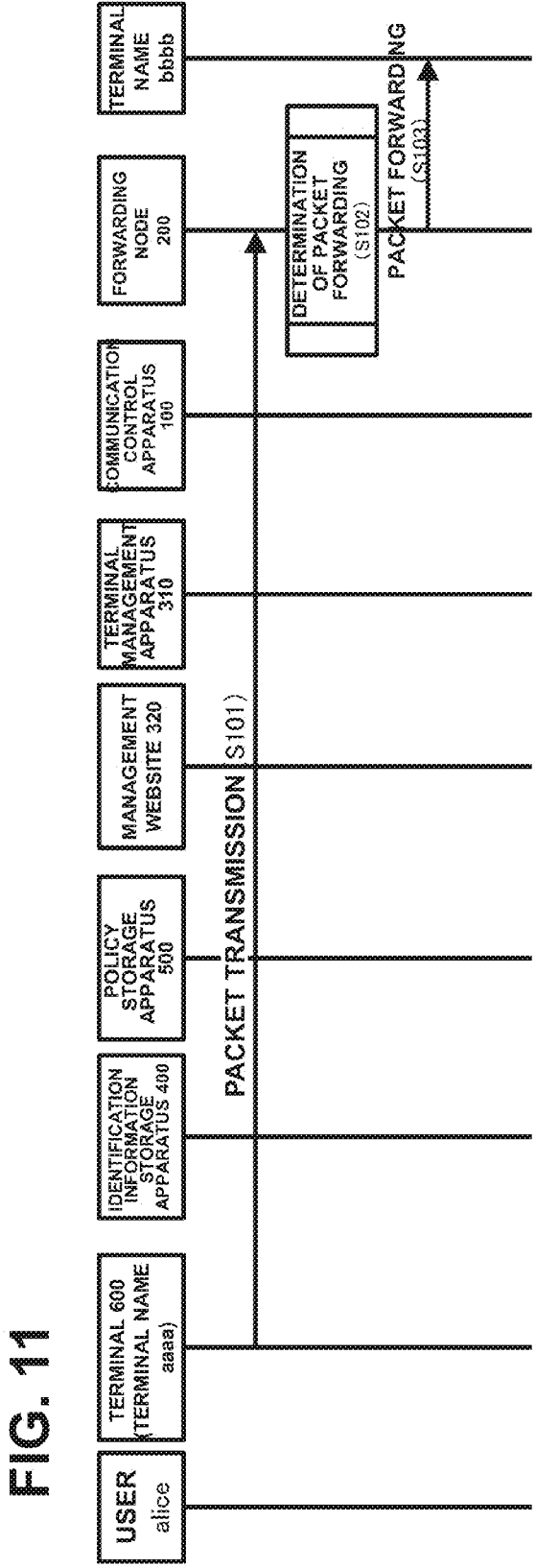
FIG. 11 is a sequence diagram illustrating an operation (communication between terminals) in the apparatus management system according to the first exemplary embodiment of the present disclosure.

Next, an operation according to the present exemplary embodiment will be described in detail with reference to the drawings. FIGS. 10 and 11 are sequence diagrams illustrating a series of operations (registration of a new terminal) according to the present exemplary embodiment. As an example, a processing procedure performed when the terminal 600 owned by the user alice is newly connected to the forwarding node 200 and transmits a packet to the terminal bbbb owned by the user bob will be described. For convenience, the following description will be made assuming that the terminal bbbb owned by the user bob is already connected to the forwarding node 200.

As illustrated in FIG. 10, first, when the user alice connects the terminal 600 to the forwarding node 200 (step S001 in FIG. 10), the identification information 700 about the terminal 600 is transmitted to the identification information storage apparatus 400 via the forwarding node 200, the communication control apparatus 100, and the terminal management apparatus 310 (step S002 in FIG. 10). The identification information storage apparatus 400 transmits identification information about all terminals to the management website 320 so that the information is disclosed (e.g. displayed) (step S003 in FIG. 10). Alternatively, the management website 320 may acquire identification information about all terminals from the identification information storage apparatus 400.

After connecting the terminal 600 to the forwarding node 200, the user alice accesses the management website 320 by using a different terminal that has already been registered and registers alice as the owner of the terminal 600 (step S004 in FIG. 10). The management website 320 determines the owner of the terminal 600 (step S005 in FIG. 10), registers alice as the owner in the identification information about the terminal 600, and stores the identification information in the identification information storage apparatus 400 (step S006 in FIG. 10). In addition, the management website 320 transmits all the identification information about the registered terminals to the terminal management apparatus 310 (step S007 in FIG. 10). In addition, the management website 320 causes the policy storage apparatus 500 to transmit all the communication policies stored therein to the terminal management apparatus 310 (step S008 in FIG. 10). The processing for transmitting all the identification information to the terminal management apparatus 310 (step S007 in FIG. 10) and the processing for transmitting all the communication policies to the terminal management apparatus 310 (step S008 in FIG. 10) may be performed in any order or in parallel.

The terminal management apparatus 310 receives all the identification information from the management website 320 and all the communication policies, determines access control information applied to the terminal 600 owned by the user alice (step S009 in FIG. 10), and transmits the access control information to the communication control apparatus 100 (step S010 in FIG. 10). For example, the terminal management apparatus 310 creates the access control information as illustrated in FIG. 8 and transmits the created access control information to the communication control apparatus 100.

Based on the access control information received from the terminal management apparatus 310, the communication control apparatus 100 creates a processing rule for executing a processing rule setting request as to the packets transmitted and received by the terminal 600 (step S011 in FIG. 10). The communication control apparatus 100 transmits the processing rule to the forwarding node 200 (step S012 in FIG. 10). The forwarding node 200 receives the processing rule from the communication control apparatus 100 and sets the processing rule therein (step S013 in FIG. 10). In this way, the sequence of the processing is completed.

After the above operation, if the terminal 600 (the terminal name aaaa) transmits a packet addressed to the terminal name bbbb, the following operation is performed. The operation will be described with reference to FIG. 11. FIG. 11 is a sequence diagram illustrating a series of operations (communication between terminals) performed for forwarding a packet. As illustrated in FIG. 11, first, the terminal 600 transmits a packet addressed to the terminal name bbbb (step S101 in FIG. 10). The packet transmitted from the terminal 600 reaches the forwarding node 200. The forwarding node 200 receives the packet transmitted from the terminal 600, performs determination of packet forwarding in accordance with the corresponding processing rule set by the communication control apparatus 100 (step S102 in FIG. 10), and forwards the packet (step S103 in FIG. 10). In this way, the communication between the terminal 600 and the terminal name bbbb can be performed. In step S102 in FIG. 11, if the forwarding node 200 determines to drop the packet, the forwarding node 200 drops the packet addressed to the terminal name bbbb from the terminal 600 (not illustrated in FIG. 11). Thus, the communication is not established.

As described above, according to the first exemplary embodiment, the administrator does not need to manage all terminals in advance. Instead, the administrator asks the users to register ownership of their terminals that are newly connected to the network. In this way, appropriate communication control according to predetermined access control information is enabled for an individual one of the terminals. As a result, management workload of the network administrator and the like can be reduced.

Second Exemplary Embodiment

Figure 12:
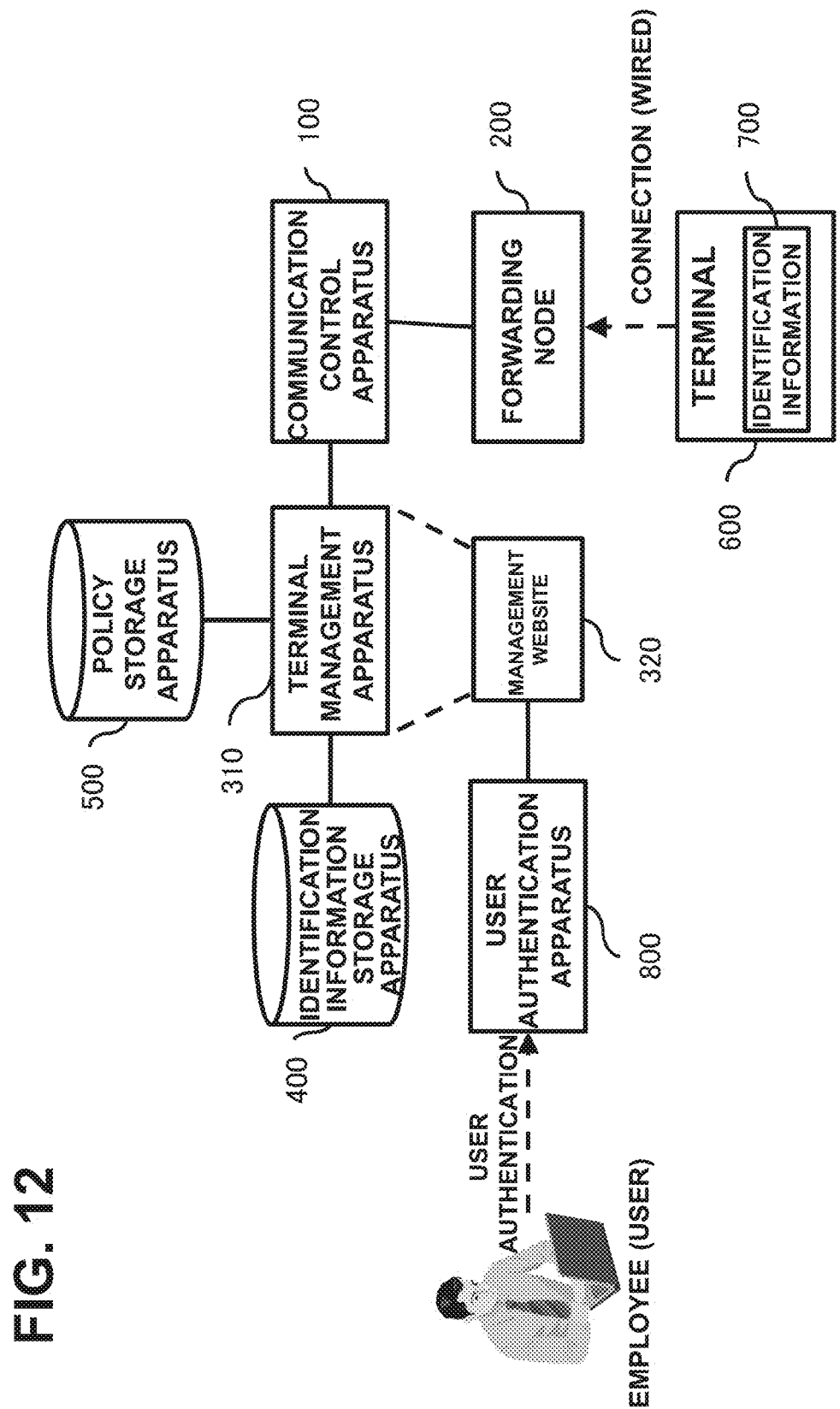
FIG. 12 illustrates a configuration of an apparatus management system according to a second exemplary embodiment of the present disclosure.

Next, a second exemplary embodiment of the present disclosure will be described. In the second exemplary embodiment, a user authentication apparatus is added to the apparatus management system according to the above first exemplary embodiment. FIG. 12 illustrates a configuration according to the second exemplary embodiment of the present disclosure. The configuration includes: a forwarding node 200 that forwards packets based on processing rules; a communication control apparatus 100 that registers processing rules in the forwarding node 200; a terminal management apparatus 310 that notifies the communication control apparatus 100 of communication policies; a management website 320 that registers, for example, information about the owners of terminals in the terminal management apparatus 310; and an identification information storage apparatus 400 and a policy storage apparatus 500 that are used by the terminal management apparatus 310 for determining communication policies. These units are the same as those according to the above first exemplary embodiment. In the second exemplary embodiment, a user authentication apparatus 800 is additionally connected to the management website 320.

The user authentication apparatus 800 performs user authentication needed for logging in to the management website 320. For example, as the user authentication, the user may be asked to input an ID and a password. The use of the user authentication can save the users the trouble of inputting ownership information and can improve the probability of the authenticity of the ownerships of their terminals.

Next, an operation according to the second exemplary embodiment will be described. Description of the same operations as those in the above first exemplary embodiment will be omitted. The following description will be made with a focus on the operational difference.

Figure 13:
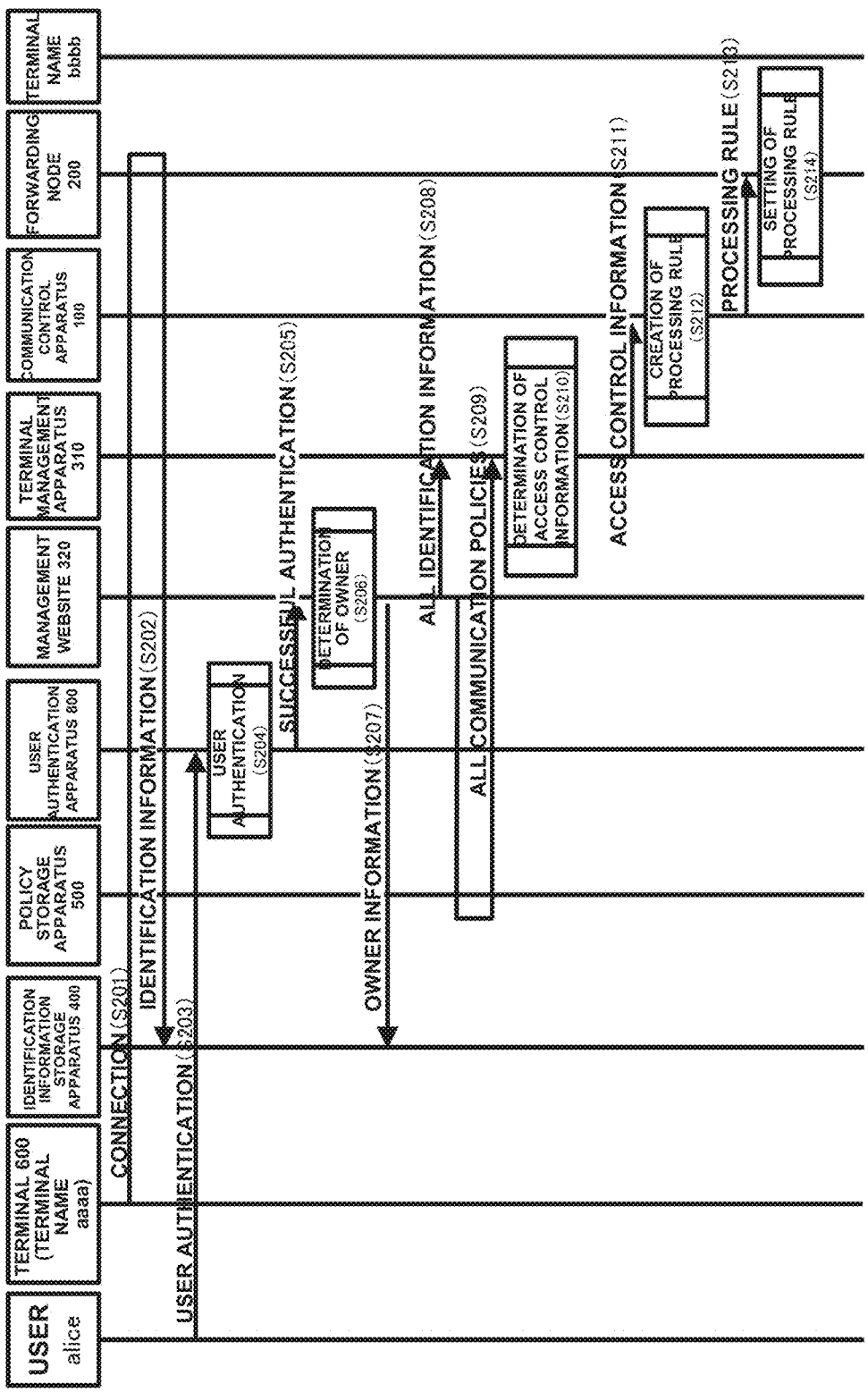
FIG. 13 is a sequence diagram illustrating an operation (registration of a new terminal) in the apparatus management system according to the second exemplary embodiment of the present disclosure.

FIG. 13 is a sequence diagram illustrating a series of operations according to the second exemplary embodiment of the present disclosure. When the user alice connects the terminal 600 to the forwarding node 200 (step S201 in FIG. 13), the identification information 700 about the terminal 600 is transmitted to the identification information storage apparatus 400 via the forwarding node 200, the communication control apparatus 100, and the terminal management apparatus 310 (step S202 in FIG. 13). Steps S201 and S202 are the same as those in the first exemplary embodiment. Next, in the second exemplary embodiment, the user accesses the user authentication apparatus 800 to perform user authentication (step S204 in FIG. 13).

If the user is successfully authenticated, the user authentication apparatus 800 notifies the management website 320 of the successful authentication (step S205 in FIG. 13), and the management website 320 registers the user name authenticated in the user authentication as the owner of the terminal (step S206 in FIG. 13). The user authentication may be performed through an ID and a password or a card such as an employee ID card. Any other method may be used for the user authentication. In addition, the user authentication apparatus 800 may be included in the management website 320 or the terminal management apparatus 310.

Next, the management website 320 registers the user name "alice" as the owner in the identification information about the terminal 600 and stores the identification information in the identification information storage apparatus 400 (step S207 in FIG. 13). In addition, the management website 320 transmits all the terminal identification information to the terminal management apparatus 310 (step S208 in FIG. 13). In addition, the management website 320 causes the policy storage apparatus 500 to transmit all the communication policies stored therein to the terminal management apparatus 310 (step S209 in FIG. 13).

The terminal management apparatus 310 receives all the identification information from the management website 320 and all the communication policies, determines access control information applied to the terminal 600 owned by the user alice (step S210 in FIG. 13), and transmits the determined access control information to the communication control apparatus 100 (step S211 in FIG. 13). Next, the communication control apparatus 100 receives the access control information from the terminal management apparatus 310, creates a processing rule for executing a processing rule setting request as to the packets transmitted and received by the terminal 600 (step S212 in FIG. 13). The communication control apparatus 100 transmits the processing rule to the forwarding node 200 (step S213 in FIG. 13). The forwarding node 200 receives the processing rule from the communication control apparatus 100 and sets the processing rule therein (step S214 in FIG. 13). In this way, the sequence of the processing is completed.

As described above, according to the second exemplary embodiment, the user authentication apparatus 800 determines the owner of a terminal through user authentication. Namely, the use of the user authentication can save the users the trouble of inputting ownership information and can improve the probability of the authenticity of the ownerships of their terminals.

Third Exemplary Embodiment

Figure 14:
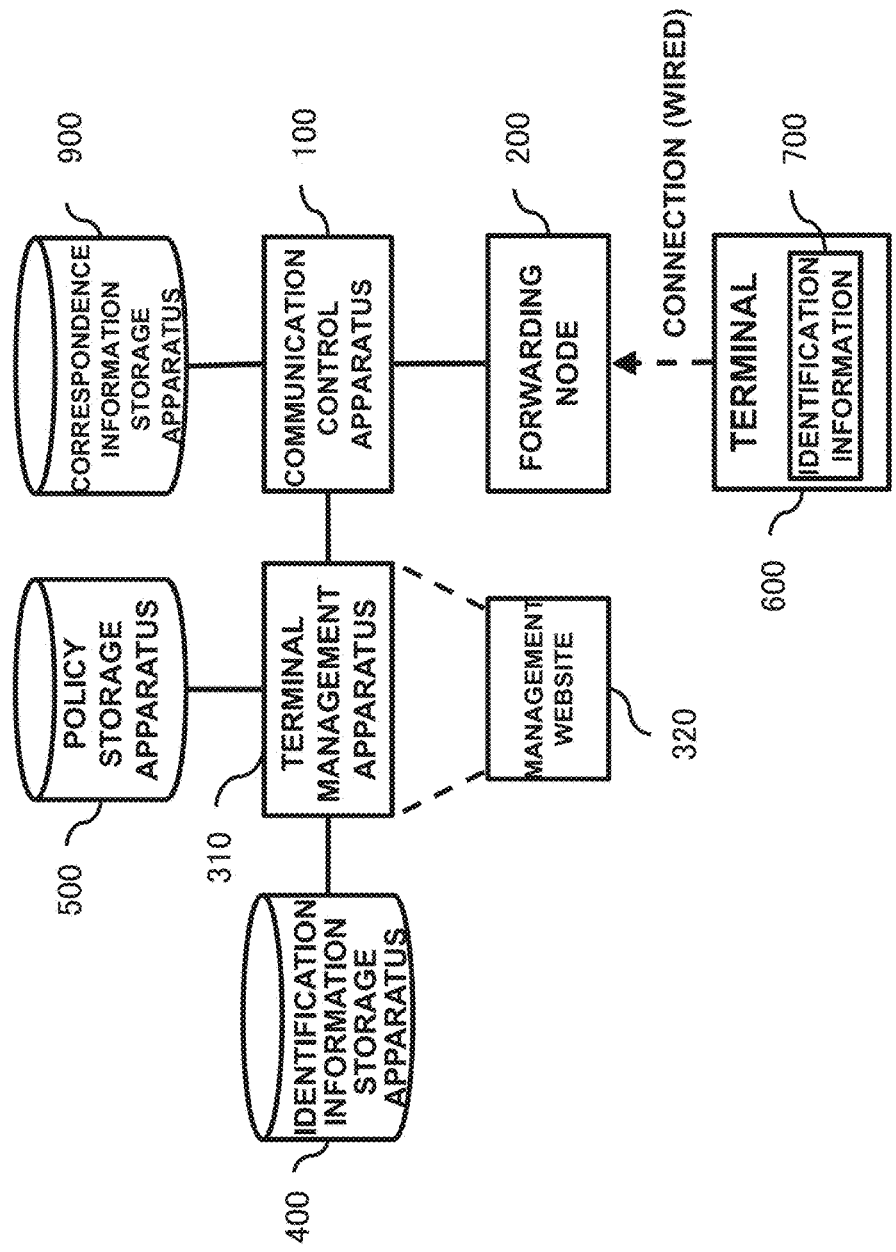
FIG. 14 illustrates a configuration of an apparatus management system according to a third exemplary embodiment of the present disclosure.

Next, a third exemplary embodiment of the present disclosure will be described. In the third exemplary embodiment, a correspondence information storage apparatus is added to the terminal authentication system according to the above first exemplary embodiment. FIG. 14 illustrates a configuration according to the third exemplary embodiment of the present disclosure. The configuration includes: a forwarding node 200 that forwards packets based on processing rules; a communication control apparatus 100 that registers processing rules in the forwarding node 200; a terminal management apparatus 310 that notifies the communication control apparatus 100 of communication policies; a management website 320 that registers, for example, information about the owners of terminals in the terminal management apparatus 310; and an identification information storage apparatus 400 and a policy storage apparatus 500 that are used by the terminal management apparatus 310 for determining communication policies. These units are the same as those according to the above first exemplary embodiment. In the third exemplary embodiment, a correspondence information storage apparatus 900 is additionally connected to the communication control apparatus 100.

In the correspondence information storage apparatus 900, the network administrator or the like stores information in which a terminal(s) and a user ID(s) of a user(s) who uses the terminal(s) are associated with each other in advance. By using the correspondence information storage apparatus 900, the users do not need to perform, for example, user registration for their terminals via the management website 320 if information about their terminals are stored in the correspondence information storage apparatus 900. Such terminals can automatically be connected to the network.

FIG. 15 illustrates an example of a correspondence relationship between an individual terminal and a corresponding user ID stored in the correspondence information storage apparatus 900. As illustrated in FIG. 15, each entry in a correspondence information table stored in the correspondence information storage apparatus 900 includes a set of a terminal name and a corresponding user ID. For example, the first entry from the top in the correspondence information table in FIG. 15 indicates that a terminal having a terminal name "aaaa" is owned by a user having a user ID "alice." The network administrator or the like registers such information in which the terminal names and the user IDs are associated in advance with each other in the correspondence information storage apparatus 900. In addition to the terminal names and the user IDs, the correspondence information table may include arbitrary information such as MAC addresses, IP addresses, connected forwarding nodes, connection ports, etc. In addition, the correspondence information storage apparatus 900 may be included in the communication control apparatus 100 or the identification information storage apparatus 400.

Next, an operation according to the third exemplary embodiment will be described. Description of the same operations as those in the above first exemplary embodiment will be omitted. The following description will be made with a focus on the operational difference.

Figure 16:
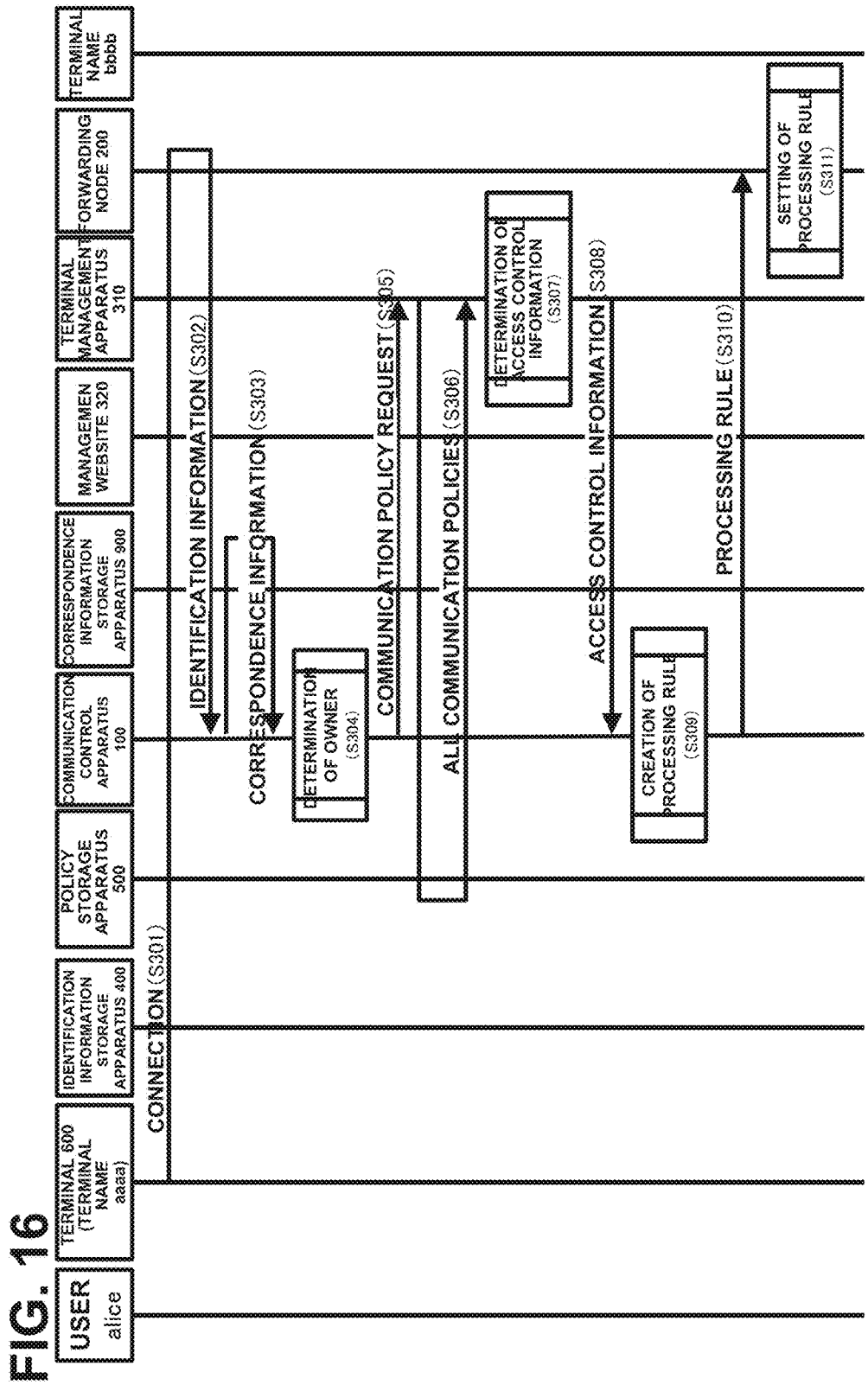
FIG. 16 is a sequence diagram illustrating an operation (registration of a new terminal) in the apparatus management system according to the third exemplary embodiment of the present disclosure.

FIG. 16 is a sequence diagram illustrating a series of operations according to the third exemplary embodiment of the present disclosure. When the user alice connects the terminal 600 to the forwarding node 200 (step S301 in FIG. 16), the identification information 700 about the terminal 600 is transmitted to the communication control apparatus 100 via the forwarding node 200 (step S302 in FIG. 16). After receiving the identification information 700, the communication control apparatus 100 requests the correspondence information storage apparatus 900 to transmit the correspondence information about terminal names and respective user IDs and receives the correspondence information (step S303 in FIG. 16). Next, the communication control apparatus 100 performs determination of the owner of the terminal 600 (step S304 in FIG. 16).

The communication control apparatus 100 determines whether the owner of the terminal having the identification information 700 exists in the correspondence information. If the owner exists, the communication control apparatus 100 requests the terminal management apparatus 310 to transmit a corresponding communication policy relating to the terminal and the owner of the terminal (step S305 in FIG. 16). When receiving the communication policy transmission request from the communication control apparatus 100, the terminal management apparatus 310 acquires all related communication policies from the policy storage apparatus 500 (step S306 in FIG. 16). Next, based on the communication policies, the terminal management apparatus 310 determines access control information about the terminal and the owner of the terminal (step S307 in FIG. 16) and notifies the communication control apparatus 100 of the result (step S308 in FIG. 16).

The communication control apparatus 100 receives the access control information from the terminal management apparatus 310 and creates a processing rule for executing a processing rule setting request as to the packets transmitted and received by the terminal 600 (step S309 in FIG. 16). The communication control apparatus 100 transmits the processing rule to the forwarding node 200 (step S310 in FIG. 16). The forwarding node 200 receives the processing rule from the communication control apparatus 100 and sets the processing rule therein (step S311 in FIG. 16). In this way, the sequence of the processing is completed.

As a result of the determination of the owner performed by the communication control apparatus 100 (step S304 in FIG. 16), if the owner of the terminal does not exist, the communication control apparatus 100 does not determine the owner. In this case, as in the first exemplary embodiment, the use registers ownership of the terminal through the management website 320. Processing performed after the user registers the ownership of the terminal is the same as that in the first exemplary embodiment.

As described above, according to the third exemplary embodiment, the correspondence information storage apparatus 900 holds correspondence information in which terminals and the respective owners (user IDs) are associated with each other in advance. After a terminal is connected, the communication control apparatus 100 determines the owner of the terminal by using the stored correspondence information. Namely, the use of the correspondence information storage apparatus 900 can save the users the trouble of inputting ownership information and can improve the probability of the authenticity of the ownerships of their terminals.

While exemplary embodiments of the present invention have thus been described, the present invention is not limited thereto. Further variations, substitutions, or adjustments can be made without departing from the basic technical concept of the present invention. For example, for convenience, the above exemplary embodiments have been described based on a relationship between a terminal and a user of the terminal. However, for example, a relationship among a server, a network apparatus, and an administrator thereof may be used. While the relationship between a terminal and a user of the terminal is seen mainly from the viewpoint of the user, the relationship among a server, a network apparatus, an administrator thereof is seen mainly from the viewpoint of the server or the network administrator. Either way, the same configurations and operations described in the exemplary embodiments of the present invention may be used.

For example, while the communication control apparatus 100, the terminal management apparatus 310, the management website 320, the identification information storage apparatus 400, the policy storage apparatus 500, the user authentication apparatus 800, and the correspondence information storage apparatus 900 are independently arranged in the above exemplary embodiments, these units may appropriately be integrated.

In addition, in the above exemplary embodiments, as illustrated in FIGS. 2 to 7, access control is performed by giving a user ID to each terminal. However, access control may be performed by using a terminal name, an access ID such as a MAC address, terminal location information, etc. given to each terminal.

In addition, for example, a fourth exemplary embodiment may be configured by combining the user authentication apparatus in the second exemplary embodiment and the correspondence information storage apparatus in the third exemplary embodiment. In this case, the communication control apparatus 100 performs determination of the owner of a terminal (step S304 in FIG. 16). If the owner of the terminal is not found, user registration by using the user authentication apparatus is performed.

Finally, suitable modes of the present invention will be summarized.

[Mode 1]
(See the apparatus management system according to the above first aspect.)

[Mode 2]
The apparatus management system according to mode 1;
wherein the terminal management apparatus displays all terminal identification information supplied by the forwarding node(s) via a management website, requests the user to register a user name indicating that the user uses the terminal, and holds the terminal in association with the user name on a one-on-one basis.

[Mode 3]
The apparatus management system according to mode 1 or 2;
wherein the terminal management apparatus at least allows the user to perform:
making a request of transmission of displayed terminal identification information from the second terminal that has already been associated with a user name stored in the terminal management apparatus; and registering a user name for the disclosed terminal identification information.

[Mode 4]
The apparatus management system according to any one of modes 1 to 3, further comprising:
a communication control apparatus that generates a packet processing rule(s) by using information indicating association between a user and a corresponding terminal that are stored in the terminal management apparatus and a communication policy applied to at least one of the user and the terminal and registers the processing rule(s) in the forwarding node(s).

[Mode 5]
An apparatus management system, comprising:
a forwarding node(s) that supplies identification information that uniquely identifies an individual terminal to a terminal management apparatus that manages the identification information;
a user authentication apparatus that uniquely identifies an individual user; and
the terminal management apparatus that uses the user authentication apparatus to determine a user who uses a terminal, and holds the terminal in association with the user.

[Mode 6]
The apparatus management system according to mode 5;
wherein the user authentication apparatus performs authentication through a user ID and a password;
wherein, if the authentication is successful, the user authentication apparatus notifies the terminal management apparatus of the user ID as a user of the terminal, and
wherein the terminal management apparatus and holds the terminal in association with the user and holds the associated information.

[Mode 7]
The apparatus management system according to any one of modes 1 to 6, further comprising:
a correspondence information storage apparatus that previously stores correspondence information in which identification information that uniquely identifies an individual terminal and a user name of the terminal are associated with each other,
wherein the terminal management apparatus receives newly received identification information and determines whether the new identification information exists in the correspondence information stored in the correspondence information storage apparatus;
wherein, if the new identification information is not stored in the correspondence information storage apparatus, the terminal management apparatus discloses the identification information about the corresponding terminal via a management website, requests the user to register a user name indicating that the user uses the terminal, associates the terminal with the user name, and stores the associated information in the correspondence information storage apparatus.

[Mode 8]
The apparatus management system according to any one of modes 1 to 7;
wherein, instead of disclosing the identification information that uniquely identifies an individual terminal, the terminal management apparatus discloses identification information that uniquely identifies an individual server or network apparatus, requests a user to register himself/herself as an administrator of the server or network apparatus, and holds the server or network apparatus in association with the administrator.

[Mode 9]
(See the apparatus management method according to the above second aspect.)

[Mode 10]
(See the apparatus management program according to the above third aspect.)

Modes 9 and 10 can be expanded in the same way as mode 1 is expanded to modes 2 to 8.

The disclosure of each of the above PTL and NPLs is incorporated herein by reference thereto. Modifications and adjustments of the exemplary embodiments and the examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

REFERENCE SIGNS LIST 11 node communication unit
12 control message processing unit
13 processing rule management unit
14 processing rule storage unit
15 forwarding node management unit
16 path and action calculation unit
17 topology management unit
18 terminal location management unit
19 communication policy management unit
20 communication policy storage unit
100 communication control apparatus
200 forwarding node
310 terminal management apparatus
320 management website
400 identification information storage apparatus
500 policy storage apparatus
600 terminal
700 identification information
800 user authentication apparatus
900 correspondence information storage apparatus

The invention claimed is:

1. An apparatus management system, comprising:
at least one forwarding node that supplies identification information that uniquely identifies an individual terminal to a terminal management apparatus that manages the identification information;
at least one first processor configured to execute machine-readable instructions to function as the terminal management apparatus that discloses the identification information about the terminal to a user, requests the user to register himself/herself as the user of the terminal from a second terminal different from the terminal, and holds the terminal in association with the user, and holds the associated information; and
at least one second processor configured to execute machine-readable instructions to function as a communication control apparatus that generates at least one packet processing rule by using information indicating association between the user and a corresponding terminal that are stored in the terminal management apparatus and a communication policy applied to at least one of the user and the corresponding terminal, and registers the at least one packet processing rule in one or more of the at least one forwarding node.

2. The apparatus management system according to claim 1;
wherein the terminal management apparatus discloses all terminal identification information supplied by the at least one forwarding node via a management website, requests the user to register a user name indicating that the user uses the terminal, and holds the terminal in association with the user name on a one-on-one basis.

3. The apparatus management system according to claim 1;
wherein the terminal management apparatus at least allows the user to perform:
making a request of transmission of disclosed terminal identification information from the second terminal that has already been associated with a user name stored in the terminal management apparatus; and
registering a user name for the disclosed terminal identification information.

4. The apparatus management system according to claim 1, wherein the at least one first processor is configured to execute the machine-readable instructions to further function as:
a user authentication apparatus that uniquely identifies an individual user,
wherein the terminal management apparatus, by using the user authentication apparatus, identifies a user who uses a terminal, and holds the terminal in association with the user.

5. The apparatus management system according to claim 4;
wherein the user authentication apparatus performs authentication through a user ID and a password;
wherein, if the authentication is successful, the user authentication apparatus notifies the terminal management apparatus of the user ID as a user of the terminal, and
wherein the terminal management apparatus holds the terminal in association with the user and holds the associated information.

6. The apparatus management system according to claim 1, further comprising:
a correspondence information storage apparatus that previously stores correspondence information in which identification information that uniquely identifies an individual terminal and a user name of the terminal associated with each other,
wherein the terminal management apparatus receives newly received identification information and determines whether the new identification information exists in the correspondence information stored in the correspondence information storage apparatus;
wherein, if the new identification information is not stored in the correspondence information storage apparatus, the terminal management apparatus discloses the identification information about the corresponding terminal via a management website, requests the user to register a user name indicating that the user uses the terminal, and stores the terminal in association with the user name in the correspondence information storage apparatus.

7. The apparatus management system according to claim 1;
wherein, instead of disclosing the identification information that uniquely identifies an individual terminal, the terminal management apparatus discloses identification information that uniquely identifies an individual server or network apparatus, requests a user to register himself/herself as an administrator of the server or network apparatus, and holds the server or network apparatus in association with the administrator.

8. An apparatus management method, comprising:
- disclosing, to a user, identification information that uniquely identifies a terminal which has been received from a forwarding node;
- requesting the user to register himself/herself as the user of the terminal from a second terminal different from the terminal, and holding the terminal in association with the user; and
- generating at least one packet processing rule by using stored information indicating association between the user and a corresponding terminal and a communication policy applied to at least one of the user and the corresponding terminal, and registering the at least one packet processing rule in at least one forwarding node.

9. A non-transitory computer-readable recording medium storing thereon a program, that, when executed by a computer, cause the computer to perform a method comprising:
- disclosing, to a user, identification information that has been transmitted from a forwarding node and that uniquely identifies a terminal;
- requesting the user to register himself/herself as the user of the terminal from a second terminal different from the terminal, and holding the associated information the terminal in association with the user; and
- generating at least one packet processing rule by using stored information indicating association between the user and a corresponding terminal and a communication policy applied to at least one of the user and the corresponding terminal, and registering the at least one packet processing rule in at least one forwarding node.

10. The apparatus management system according to claim 2;
- wherein the terminal management apparatus at least allows the user to perform:
- making a request of transmission of disclosed terminal identification information from the second terminal that has already been associated with a user name stored in the terminal management apparatus; and
- registering a user name for the disclosed terminal identification information.

11. The apparatus management system according to claim 2, further comprising:
- a user authentication apparatus that uniquely identifies an individual user,
- wherein the terminal management apparatus, by using the user authentication apparatus, identifies a user who uses a terminal, and holds the terminal in association with the user.

12. The apparatus management system according to claim 3, further comprising:
- a user authentication apparatus that uniquely identifies an individual user,
- wherein the terminal management apparatus, by using the user authentication apparatus, identifies a user who uses a terminal, and holds the terminal in association with the user.

13. The apparatus management system according to claim 2, further comprising:
- a correspondence information storage apparatus that previously stores correspondence information in which identification information that uniquely identifies an individual terminal and a user name of the terminal associated with each other,
- wherein the terminal management apparatus receives newly received identification information and determines whether the new identification information exists in the correspondence information stored in the correspondence information storage apparatus;
- wherein, if the new identification information is not stored in the correspondence information storage apparatus, the terminal management apparatus discloses the identification information about the corresponding terminal via a management website, requests the user to register a user name indicating that the user uses the terminal, and stores the terminal in association with the user name in the correspondence information storage apparatus.

14. The apparatus management system according to claim 3, further comprising:
- a correspondence information storage apparatus that previously stores correspondence information in which identification information that uniquely identifies an individual terminal and a user name of the terminal associated with each other,
- wherein the terminal management apparatus receives newly received identification information and determines whether the new identification information exists in the correspondence information stored in the correspondence information storage apparatus;
- wherein, if the new identification information is not stored in the correspondence information storage apparatus, the terminal management apparatus discloses the identification information about the corresponding terminal via a management website, requests the user to register a user name indicating that the user uses the terminal, and stores the terminal in association with the user name in the correspondence information storage apparatus.

15. The apparatus management system according to claim 1, further comprising:
- a correspondence information storage apparatus that previously stores correspondence information in which identification information that uniquely identifies an individual terminal and a user name of the terminal associated with each other,
- wherein the terminal management apparatus receives newly received identification information and determines whether the new identification information exists in the correspondence information stored in the correspondence information storage apparatus;
- wherein, if the new identification information is not stored in the correspondence information storage apparatus, the terminal management apparatus discloses the identification information about the corresponding terminal via a management website, requests the user to register a user name indicating that the user uses the terminal, and stores the terminal in association with the user name in the correspondence information storage apparatus.

16. The apparatus management system according to claim 4, further comprising:
- a correspondence information storage apparatus that previously stores correspondence information in which identification information that uniquely identifies an individual terminal and a user name of the terminal associated with each other,
- wherein the terminal management apparatus receives newly received identification information and determines whether the new identification information exists in the correspondence information stored in the correspondence information storage apparatus;
- wherein, if the new identification information is not stored in the correspondence information storage apparatus, the terminal management apparatus discloses the identification information about the corresponding terminal via a management website, requests the user to register a user name indicating that the user uses the terminal, and stores the terminal in association with the user name in the correspondence information storage apparatus.

\* \* \* \* \*